UNITED STATES PATENT OFFICE.

HERMANN SCHULZE-BERGE, OF PITTSBURG, PENNSYLVANIA, ASSIGNOR OF ONE-HALF TO JESSE H. LIPPINCOTT, OF SAME PLACE.

METHOD OF ORNAMENTING GLASSWARE.

SPECIFICATION forming part of Letters Patent No. 276,897, dated May 1, 1883.

Application filed November 8, 1882. (Specimens.)

*To all whom it may concern:*

Be it known that I, HERMANN SCHULZE-BERGE, of Pittsburg, in the county of Allegheny and State of Pennsylvania, have invented a new and useful Improvement in Methods of Ornamenting Glassware; and I do hereby declare the following to be a full, clear, and exact description thereof.

Glass, as is well known, is a silicate of potash or soda compounded with other ingredients, and is fusible at a higher or lower temperature, according to the relative proportion of the alkali and silica. The greater the proportion of the fixed alkali the more readily is the glass fusible. Taking advantage of this fact, I have invented a method of producing fixed marks upon glassware, and thus impressing any desired design or decoration upon its surface by means of applying thereto one or other of the fixed alkalies, or a mixture of them, either as a hydrate or as a salt, and then exposing the glass thus coated to a sufficient heat to cause the alkali to unite with the glass, which it will do at a lower temperature than that at which the glass will melt. This union of the fixed alkali with the glass effects a marked change in its appearance, in some cases producing opacity somewhat similar to that produced by the well-known action of hydrofluoric acid.

My invention may be made use of to produce various effects—as, for example, the entire surface of the glass may be rendered opaque, or parts of it more opaque than others; or the figure or design may be opaque; or the groundwork may be opaque and the design transparent.

To enable those skilled in the art to make use of my invention, I will proceed to describe the method of its application and use.

The alkalies which I use are those known as "fixed alkalies"—soda and potash—and may be employed in the form of hydrates—as caustic soda and caustic potash—or in the form of salts, as carbonates, sulphates, or phosphates or soaps. The method of employing them must be such that the alkali will be brought into close contact with the surface of the glassware to be ornamented or marked. On the quantity of alkali applied to the glass will depend the character of the marks produced thereby. If but little is used, the marks produced are slight, or will pass away entirely on the application of heat. If the alkalies are applied in excess, a soluble silicate is formed on the surface of the glassware, which will not withstand the action of water, and the silicate formed thereby will sooner or later separate from the surface of the glassware. Especially is this the case where the caustic alkalies are used in excess.

In order to apply the alkali to the surface of the glass, it may be dissolved in water, a saturated solution being best, and in order to prevent the crystalline deposit left on the glass by the evaporation of the water from falling off during the heating process it will be better to add a very small amount of mucilage, or of boiled starch or similar substance, to the solution. When the salts of the fixed alkalies dissolved in water are used the crystalline deposit left on the glass by the evaporation of the water contains some water, which, when the temperature is raised, as hereinafter described, is driven off, and fractures or scales the salt from the surface of the article. This may be obviated in a degree by raising the temperature very slowly; but I prefer to cover the decoration, when the water has evaporated, with a thin film of varnish, which entirely obviates it. This solution is applied to the surface of the glassware, which should be previously cleaned and dried, by means of a pen or hair pencil, care being taken not to apply it in such quantity as that the marks or lines will run into one another.

Instead of using an aqueous solution of the alkalies, they may be dried and finely pulverized, and then thoroughly mixed with a few drops of linseed-oil, sufficient to moisten the mass, and then rubbing them into Venice turpentine, or other resinous liquid or semi-liquid or varnish. They must be very intimately mixed with the vehicle used, so that all parts of the glass designed to be affected by the alkali may receive a deposit, and that it may be applied with the utmost uniformity. In this condition the alkali may be applied to the surface of the glass by means of a hair brush, or by a stencil or a stamp, or otherwise.

If it is designed to render the whole surface of the glass opaque, it may be immersed in the alkaline solution or mixture containing the alkali, care being taken that the whole surface is uniformly coated. In this case, especially if the surface to be coated is large, the solution or mixture should be of sufficient consistency to remain adherent to the glass and not to run, so as to be a thicker deposit on some parts than on others. When thus coated, if it is desired to produce a clear, transparent pattern on an opaque ground, the design may be traced on the coated surface after it is dry, or nearly so, by removing the deposited alkali by means of any suitable tool or instrument.

When the alkali has been applied to the surface of the article of glassware to be ornamented in the manner described it is placed in an oven and dried by means of a gradually-increasing heat. If varnish has been used, as before described, the heat should be increased to a point—say 100° Fahrenheit—sufficient to evaporate or volatilize the oily and resinous matters, and then to a point sufficient to char and burn off the carbonaceous matter or other organic substances deposited by the burning off of the varnish or mucilage. After this the heat of the oven or furnace is raised gradually to a degree sufficient to cause the desired reaction to take place between the alkali or salt of alkali and the silica of the glass. This degree of heat is about a dark red heat; but no specific direction can be given as to the exact amount of heat required, because that will vary with the composition of the glass, accordingly as it contains a greater or less proportion of silica, and also with the description of alkali employed. The potash salts act on the glass at a lower temperature than the soda salts. A mixture of soda salt and potash salt acts on the glass at a still lower temperature, and the caustic alkalies at a lower temperature still. This, however, is a matter that can be readily determined by experience. When the requisite degree of heat has been reached the glass article should remain in the furnace for a few minutes, according to the temperature, after which the heat is gradually reduced until the glass is cool enough to be removed, and then it is to be washed with water in order to remove any particles of alkali which may still remain adherent thereto and not combined with the glass. The operation is then complete.

The sulphates and phosphates of the alkalies, used in the manner described, do not render the surface of the glass opaque, but merely produce a crystallized appearance, leaving the glass transparent, or nearly so, while the caustic alkalies and the carbonates of the alkalies produce a decided opacity. In decorating glassware by the method I have described, it will therefore be only necessary to use the several alkalies named on different portions of the surface to be decorated in order to produce a varied and pleasing effect.

It should be noticed that where the caustic alkalies are used in my process the articles of glassware should not be permitted to remain long with the alkaline deposit upon them before being placed in the oven, because the hydrates of the alkalies readily absorb moisture from the atmosphere and deliquesce, which would cause the deposit to run and spoil the pattern or design.

Having thus described my improvement, what I claim as my invention, and desire to secure by Letters Patent, is—

1. The method hereinbefore described of treating glassware so as to produce an opaque or partially opaque and crystallized appearance on its surface by first applying thereto a thin deposit of fixed alkali, either the hydrate or some of the salts thereof, and then exposing the glassware so treated to a temperature which gradually increases to nearly a dark red heat until a reaction is produced between the deposited alkali and the silica of the glassware, substantially as and for the purposes described.

2. The method of decorating glassware hereinbefore described, consisting of first painting or drawing on the surface of glassware with an aqueous solution of one of the fixed alkalies, (using the hydrate or some of the salts of such alkali, or a mixture thereof,) thickened with mucilage or starch or equivalent substance, and then exposing such glassware to a gradually-increasing heat in a furnace until a reaction takes place between the silica of the glassware and the deposited alkali, substantially as described, and for the purposes set forth.

3. The method hereinbefore described of decorating glassware by painting, drawing, or otherwise applying to the surface of glassware any desired marks, lines, or designs with a mixture of varnish or its equivalent and finely-powdered salt of soda or equivalent fixed alkali, then exposing the glassware so prepared to heat in a furnace sufficient to volatilize the volatile portions of such vehicle, and then increasing the heat until the solid particles are charred or burned away, and then to a further degree of heat until a reaction takes place between the deposited alkali and the silica of the glass, substantially as described.

In testimony whereof I have hereunto set my hand this 26th day of October, A. D. 1882.

HERMANN SCHULZE-BERGE.

Witnesses:
T. B. KERR,
W. B. CORWIN.